S. NORRIS.
Locomotive.
No. 11,733.
Patented Sept. 26, 1854.
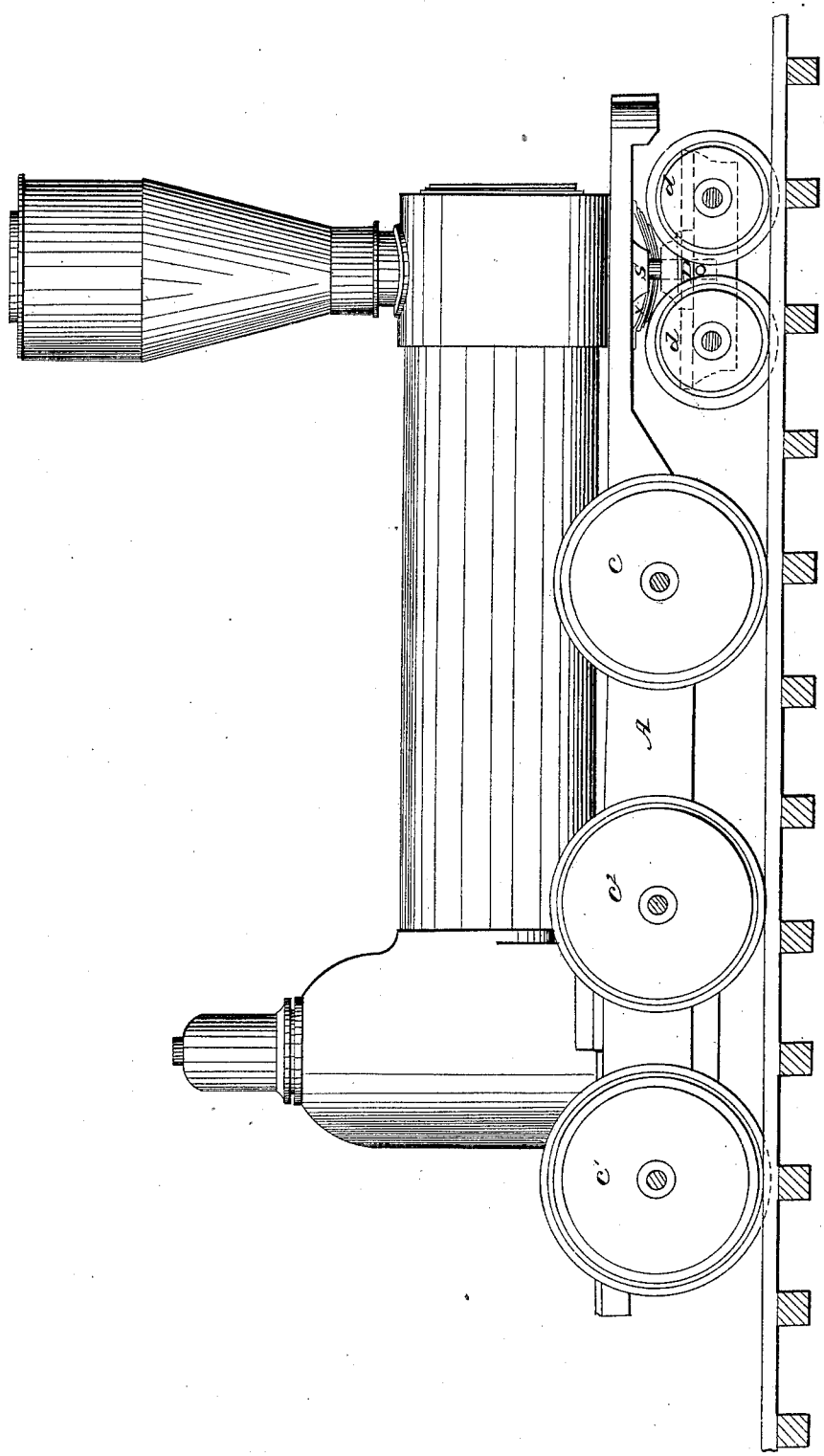

UNITED STATES PATENT OFFICE.

SEPTIMUS NORRIS, OF PHILADELPHIA, PENNSYLVANIA.

RUNNING-GEAR OF LOCOMOTIVE-ENGINES.

Specification forming part of Letters Patent No. 11,733, dated September 26, 1854; Reissued March 2, 1858, No. 534.

*To all whom it may concern:*

Be it known that I, SEPTIMUS NORRIS, of the city and county of Philadelphia and State of Pennsylvania, have invented certain new and useful Improvements in Locomotive-Engines for Railroads, of which the following is a full, clear, and exact description, reference being had to the accompanying drawing, which forms part of this specification and which represents a side elevation of my improved locomotive-engine.

My invention and improvement relates to the arrangement of the driving and guide wheels of the locomotive; I shall therefore omit all description of the fire-box, boiler, cylinders, and their appurtenances.

A suitable framing (A) serves to carry the boiler and engines and mechanism for giving motion to the driving wheels ($c$, $c'$, and $c^2$,), which are arranged in pairs in the usual manner. The front pair of wheels ($c$), as represented, are situated in front of the center of the boiler so as to be in advance of the center of gravity, of the entire engine, while the axle which unites the rear pair of wheels ($c'$) crosses the frame at the back of the ash-box, and the intermediate wheels ($c^2$) run a little in advance of the rear wheels. These wheels ($c$, $c'$, and $c^2$), being severally driving wheels, may be coupled in the ordinary way by connecting rods: the rear pair of wheels ($c'$) only are flanged. A swivel frame (D), having flanged guide wheels ($d$) on either side, is attached by a central pivot (S) to the front end of the engine frame; the object of these guide wheels is not to support the front end of the engine while running on a straight and level track, and therefore the frame does not rest upon it, the shoulders of the coupling plates not meeting, so that the weight of the boiler and machinery is thrown upon the driving wheels, and the flanged guide wheels simply serve to guide the front end of the engine on the track while the rear driving wheels, which are flanged prevent that end of the engine from running off the track. A spring ($x$) as represented by the red lines may be placed between the guide wheel frame and the under side of the engine frame to prevent a concussion when the two frames suddenly approach toward each other. The engine in turning a curve swings on its rear wheels while the intermediate unflanged driving wheels move laterally on the rails, to either side according to the direction of the curve. The guide wheels thus arranged will more readily lead in the proper direction in turning a curve than they would if the weight of the locomotive rested upon them; therefore the tendency of the engine to run off the track, in turning a curve of short radius, is, by this arrangement, diminished: while as the weight of the boiler, frame and machinery rests upon the driving wheels, their adhesion to the rails is increased to the maximum; consequently the difficulty of ascending inclined planes or moving over slippery rails is diminished in the same ratio that the tractive power of the engine is, by this means, augmented.

A greater or less number of driving or guide wheels may be employed, and their relative arrangement may be varied to suit the views of different constructors and to adapt them to different circumstances.

I claim—

In a locomotive engine not having more than one pair of flanged driving wheels the combination with the driving wheels of one or more pairs of flanged guide wheels to keep or aid in keeping the engine upon the rails, when the driving and guide wheels are so arranged that while running upon a straight rail the former shall carry the load and the latter act as guides.

In testimony whereof I have hereunto subscribed my name.

SEPTIMUS NORRIS.

Witnesses:
P. H. WATSON,
P. HANNAY.

[FIRST PRINTED 1913.]